United States Patent
Imamura et al.

(10) Patent No.: US 8,395,791 B2
(45) Date of Patent: Mar. 12, 2013

(54) IMAGE FORMING DEVICE AND IMAGE FORMING PROGRAM

(75) Inventors: Masahiro Imamura, Toyokawa (JP); Tomoko Maruyama, Toyokawa (JP); Kazuhiro Tomiyasu, Toyokawa (JP); Takeshi Hibino, Toyokawa (JP); Kentaro Nagatani, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1124 days.

(21) Appl. No.: 12/333,339

(22) Filed: Dec. 12, 2008

(65) Prior Publication Data

US 2009/0153901 A1 Jun. 18, 2009

(30) Foreign Application Priority Data

Dec. 13, 2007 (JP) ................................ 2007-321730

(51) Int. Cl.
*G06F 15/00* (2006.01)
*G06K 1/00* (2006.01)
(52) U.S. Cl. ..................... 358/1.14; 358/1.9; 358/1.15
(58) Field of Classification Search .................. None
See application file for complete search history.

(56) References Cited

U.S. PATENT DOCUMENTS

| | | | |
|---|---|---|---|
| 2004/0258277 A1 | 12/2004 | Ueda | |
| 2006/0007500 A1* | 1/2006 | Abe et al. | 358/401 |
| 2007/0019231 A1* | 1/2007 | Maeshima | 358/1.15 |

FOREIGN PATENT DOCUMENTS

| | | |
|---|---|---|
| JP | 6-183110 A | 7/1994 |
| JP | 07-195798 | 8/1995 |
| JP | 2005-032237 | 2/2005 |
| JP | 2005-165844 A | 6/2005 |
| JP | 2006-224472 | 8/2006 |
| JP | 2006-255936 | 9/2006 |
| JP | 2006-334873 A | 12/2006 |
| JP | 2007-207166 | 8/2007 |

OTHER PUBLICATIONS

Notification of Reason(s) for Refusal issued in the corresponding Japanese Patent Application No. 2007-321730 dated Nov. 4, 2009, and an English Translation thereof.

* cited by examiner

*Primary Examiner* — Thierry Pham
(74) *Attorney, Agent, or Firm* — Buchanan Ingersoll & Rooney PC (57) ABSTRACT

The image forming device capable of executing an authentication print printing includes: a communication interface for receiving job data; a job data property deriving unit for deriving a property of the job by referencing data contained in the job data other than data explicitly indicating to execute/not to execute the authentication print printing and outputting the property as job property data; an authentication print setting deciding unit for deciding whether or not to execute the job as the authentication print printing; an authentication unit; a user authentication unit for outputting the result of the user authentication; and a job executing unit for executing the job related to the job data.

19 Claims, 7 Drawing Sheets

IMAGE FORMING DEVICE AND IMAGE FORMING PROGRAM

This application is based on an application No. 2007-321730 filed in Japan, the contents of which are hereby incorporated by reference.

BACKGROUND OF THE INVENTION

1. Field of the Invention

The present invention relates to an image forming device and an image forming program, and more particularly, to an image forming device which requests user authentication for the start of printout process, and an image forming program used in the image forming device.

2. Description of the Related Art

In recent years, the image forming device is connected to a plurality of information processing devices (terminals) by way of a network, and is shared by a plurality of users using the plurality of information processing devices. The image forming device is a digital multifunction peripheral (Multi-Function Peripheral (MFP), a Scan Print Copy (SPC), or All In One (AIO)) having at least two or more functions of a printer, a facsimile, a copying machine, a scanner, and the like. The information processing device (terminal) is a personal computer (PC), or the like. The image forming device and the information processing device are communicably connected to each other by way of a communication network such as Local Area Network (LAN) and the Internet to configure an image forming system. The image forming system can be formed by connecting one image forming device and one information processing device at one-to-one in its minimum configuration. Recently, however, a large-scale image forming system is often built up in which a plurality of image forming devices and a plurality of information processing devices are connected to each other.

When the user attempts to output a printed material of a desired document using the image forming device in such image forming system, the user uses the information processing device to specify the data file of the relevant document stored in the image forming system, specify the image forming device to execute the printout of the relevant document, and finally, input an instruction to execute the printout to the information processing device.

The information processing device sends job data generated using the specified data file and various setting data related to the printout to the specified image forming device. The image forming device that received the job data executes printing based on the job data. The document printed material is discharged from a paper discharge tray of the image forming device. The user then goes to the image forming device and collects the discharged document printed material.

However, the user is not necessarily nearby the image forming device when the document printed material is being discharged from the image forming device. Since the image forming device is shared by a plurality of users, another user might be near the image forming device. Thus, a problem of ensuring information security related to the document printed material discharged from the image forming device arises in the image forming system.

JP 6-183110 A discloses a printing device (printer). Such printing device receives print data from a plurality of host computers connected by way of a network, and executes printing based on the received print data. The print data sent to the printer may contain a password. Thus, when receiving the print data from the computer, the printer determines whether or not a password is contained in the received print data. When determined that the received data contains a password, the printer executes the printout based on the received print data only after confirming that the user has correctly input the password through a user interface of the printer.

The printing device disclosed in JP 6-183110 A executes printing when the password given to the print data and the password input by the user match. The image forming device thereby ensures information security of the information indicated by the print data in this manner.

The technique disclosed in JP 6-183110 A is a technique in which the printing device requests a password to be input by the user, that is, user authentication as a trigger for defining the start of printout. In the technique disclosed in JP 6-183110 A, the user must input information related to the setting of the user authentication such as password when instructing printout to the printing device.

JP 2006-334873 A discloses an image forming device for executing printing in response to a printing instruction from an external device. When the received printing instruction requests to ensure security, the authentication process for ensuring the security is performed, and the print data related to the printing instruction is acquired only after the authentication process is successfully completed in the image forming device.

The image forming device disclosed in JP 2006-334873 A thus suppresses the capacity of the memory necessary for keeping the print data at low level, and ensures information security on the printing process.

JP 2005-165844 A discloses a printing system. The printing system includes a printer for executing printing based on the received print data, and a client device for transmitting the print data to the printer. In such printing system, print control information can be additionally added to the print data. The print control information contains limiting information related to the process on the print data and instruction information for printing a predetermined image. The print control information to be additionally added is information mainly provided to control a specific process. Accordingly, in the printing system, the printer can control the process on the received print data based on the limit information contained in the received print control information, or print the print data and print the predetermined image contained in the received print control information.

According to such configuration, the printing system disclosed in JP 2005-165844 A can print a signature (predetermined image) indicating document acknowledgment, or can prohibit or permit printing using the received print data.

Numerous documents related to information security of the image forming system have been proposed.

The image forming device for performing user authentication through a predetermined user authentication means arranged in the image forming device at the start of execution of the printout as disclosed in JP 6-183110 A is already widely known. The technical methodology adopted in the technique of JP 6-183110 A is an effective methodology for ensuring the user to be near the image forming device when the image forming device actually executes the printout.

However, it is sometimes bothersome for the user to perform user authentication on the predetermined user authentication means arranged in the image forming device when causing the image forming device to actually start the execution of the printout. In particular, the user particularly feels the user authentication bothersome when the user outputs the printed material of the document to be distributed to a great number of people.

SUMMARY OF THE INVENTION

In view of the above problems, it is an object of the present invention to provide an image forming device. The image forming device automatically and appropriately sets, based on a predetermined condition, the setting of whether or not to perform user authentication using a predetermined user authentication means arranged in the image forming device to start the execution of the printout for each job that the image forming device receives. In the present invention, the user does not need to perform the setting related to the user authentication when the user instructs execution of a job including printout. Also, the present invention provides an image forming system including the image forming device according to the present invention. The subject invention ensures information security on the printed and discharged document printed material at high level and enhances the operability of the user with respect to the image forming device, thereby enhancing the productivity of the image forming process such as printing.

In an aspect of the present invention, the present invention is an image forming device capable of performing an authentication print printing, which is a printout process for performing user authentication using a predetermined authentication device and determining a start of execution of a printout process based on a result of the user authentication. The image forming device includes: a communication interface which receives job data from a terminal, communicating with the external terminal; a job data property deriving unit which derives a property of a job related to the job data by referencing data contained in the job data other than data explicitly indicating to execute/not to execute the authentication print printing, and outputs the property as job property data; an authentication print setting deciding unit which decides whether or not to execute the job related to the job data as the authentication print printing based on the job property data; an authentication unit which is the predetermined authentication device; a user authentication unit which outputs the result of the user authentication using the authentication unit; and a job executing unit which executes the job related to the job data based on the result of the user authentication.

In another aspect of the present invention, the present invention is a computer readable medium storing an image forming program executable by a computer of an image forming device capable of executing an authentication print printing, which is a printout process for performing user authentication using a predetermined authentication device and determining a start of execution of a printout process based on a result of the user authentication. The image forming program includes: code which receives job data from a terminal, communicating with the external terminal; code which derives a property of a job related to the job data by referencing data contained in the job data other than data explicitly indicating to execute/not to execute the authentication print printing, and outputs the property as job property data; code which decides whether or not to execute the job related to the job data as the authentication print printing based on the job property data; code which outputs the result of the user authentication using an authentication unit which is the predetermined authentication device; and code that executes the job related to the job data based on the result of the user authentication.

The present invention provides an image forming device for performing a printout based on job data sent from an information processing device. In the image forming device, whether or not to execute user authentication using a predetermined user authentication means arranged in the image forming device at the start of execution of the printout is automatically and appropriately determined based on a predetermined condition with respect to each job that the image forming device receives. The present invention also provides an image forming system or program. The image forming device etc. of the present invention sufficiently ensures information security of the document printed material that is printed out and enhances the operability of the user on the image forming device etc., thereby enhancing the productivity of the image forming process.

Other objects and further features of the present invention will be apparent from the following detailed description when read in conjunction with the accompanying drawings.

DETAILED DESCRIPTION OF THE PREFERRED EMBODIMENTS

The present embodiment relates to an image forming device, an image forming system including a terminal and the image forming device, and an image forming program executed in the image forming device.

The image forming device according to the present embodiment is an image forming device capable of executing "authentication print (authentication & print)" printout process, to be hereinafter described. The image forming device according to the present embodiment is an image forming device capable of executing printout process by appropriately switching between the "authentication print" printout process and a normal printout process for each job to be executed. Such switching is automatically executed by the image forming device based on information contained in the job data. In the image forming device according to the present embodiment, the image forming device does not need the data (parameter, flag, etc.) that explicitly indicates ON/OFF of the authentication print setting in order to perform the switching.

The terminal can generate job data. In this case, the image forming device references the job data generated by the terminal, automatically switches between the "authentication print" printout process and the normal printout process, and executes the printout.

Therefore, in the image forming device etc. according to the present embodiment, the setting of the "authentication print" printout does not need to be considered at all when the user inputs a job to the image forming device. The image forming device makes a decision about necessity to turn on the "authentication print" printout setting. The image forming device automatically turns ON the "authentication print" printout setting of the printout process when decided as necessary, and then executes the printout.

Thus, in the image forming system according to the present embodiment, even in a case where the device is normally operated with the setting of the "authentication print" printout turned "OFF" so that user's operability and productivity of the image forming device etc. should be prioritized, if the image forming device configuring the image forming system decides to execute the printout as "authentication print" printout process in terms of ensuring information security, switch is automatically made to the "authentication print" printout and the printout executed. Therefore, in the image forming process using the image forming system of the present embodiment, ensuring of convenience and productivity of the image forming process, and ensuring of information security are met at high level.

<Regarding "Authentication Print (Authentication & Print)" Printout Process>

The "authentication print (authentication & print)" printout process will be briefly described before specifically describing the embodiment of the present invention. The "authentication (&) print" printing refers to a printout mode, when the image forming device executes the job involving the printout process, of when the image forming device performs user authentication using a predetermined authentication means, and starts the printout on the job only when the user authentication is successful. In other words, in the authentication print printout, the image forming device does not immediately execute the printout even when accepting the job. Instead, the image forming device holds the data related to the printout until confirming that the user authentication using the predetermined authentication means is successful, and starts the execution of the printout after confirming that the user authentication is successful. The user authentication herein is a user authentication on the user who has input the job. The authentication print is also referred to as "Touch & Print".

In the "normal" printout process, the image forming device immediately executes the printout on the job when accepting the job. The authentication print printout process differs from the normal printout process in that the printout does not start until the user authentication using the predetermined authentication means is successful.

The preferred embodiments of the present invention will now be described with reference to the accompanied drawings.

Figure 1:
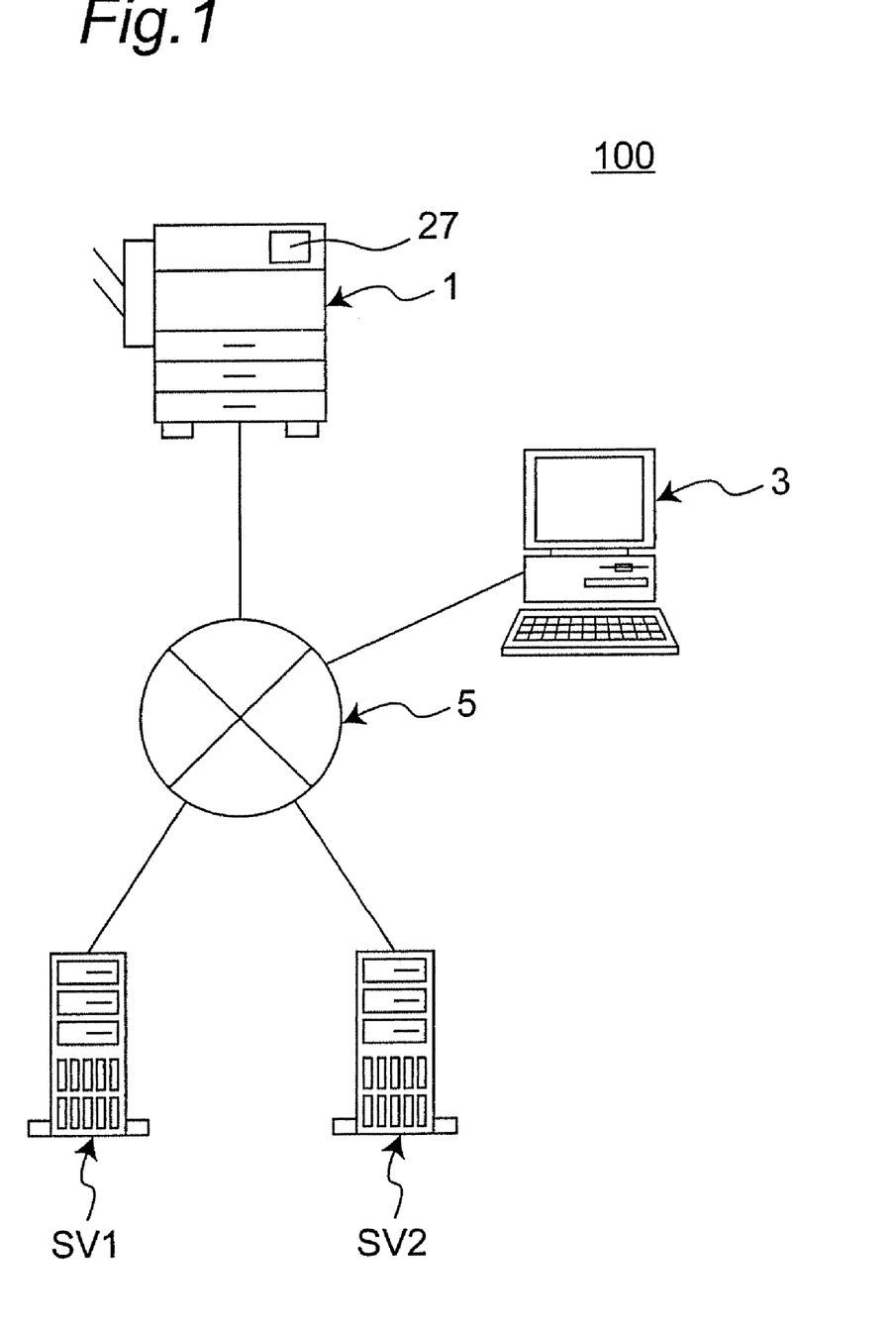
FIG. 1 is a configuration diagram of an image forming system according to an embodiment of the present invention.

FIG. 1 is a schematic diagram of a configuration of an image forming system 100 according to an embodiment of the present invention.

The image forming system 100 includes a digital multifunction peripheral (MFP) 1 serving as an image forming device, and a personal computer (PC) 3 serving as a terminal. The MFP 1 and the PC 3 are communicably connected by way of a network 5.

The digital multifunction peripheral 1 configures an image forming device according to the present embodiment. The digital multifunction peripheral (MFP) is an image forming device collectively having plural functions such as print function, copy function, scanner function, facsimile function, e-mail transmission function, and the like. However, the image forming device according to the present embodiment merely needs to be an image forming device capable of receiving the job data transmitted from the image forming device terminal via the network, and executing the printout process based on the relevant job data. The MFP 1 is also equipped with an authentication unit 27 serving as a predetermined authentication means for performing user authentication in the authentication print printout process. The authentication unit 27 does not necessarily need to be built in the body of the MFP 1. The authentication unit 27 merely needs to be connected to the respective MFP 1, and arranged proximate thereto.

The personal computer 3 configures a terminal (information processing device) according to the present embodiment. The terminal according to the present embodiment does not need to be an information processing device having versatility such as a personal computer. The terminal according to the present embodiment can be realized simply with a device capable of instructing printout of the document to the image forming device.

The image forming system 100 may also include a plurality of server devices SV1, SV2.

The server device SV1 is an authentication server. The authentication server is a server having a function of comparing user identifying information (e.g., user ID) and user authentication information (e.g., password, authentication data), both of which are sent from a client (e.g., MFP 1 and PC 3), with user information and user authentication information held in its device, determining success/fail of the user authentication, and returning the determination result to the client.

The server device SV2 is a data server. The data server SV2 holds data file of a document and data of the job (job data) to be transmitted to the MFP 1, and transmits the data file of the document and the job data in response to a request from the outside.

However, the servers SV1, SV2 are not essential elements in the image forming system 100. The MFP 1 or the PC 3 configuring the image forming system may be provided with the function of the server as necessary.

<Hardware Configuration of the Image Forming Device>

Figure 2:
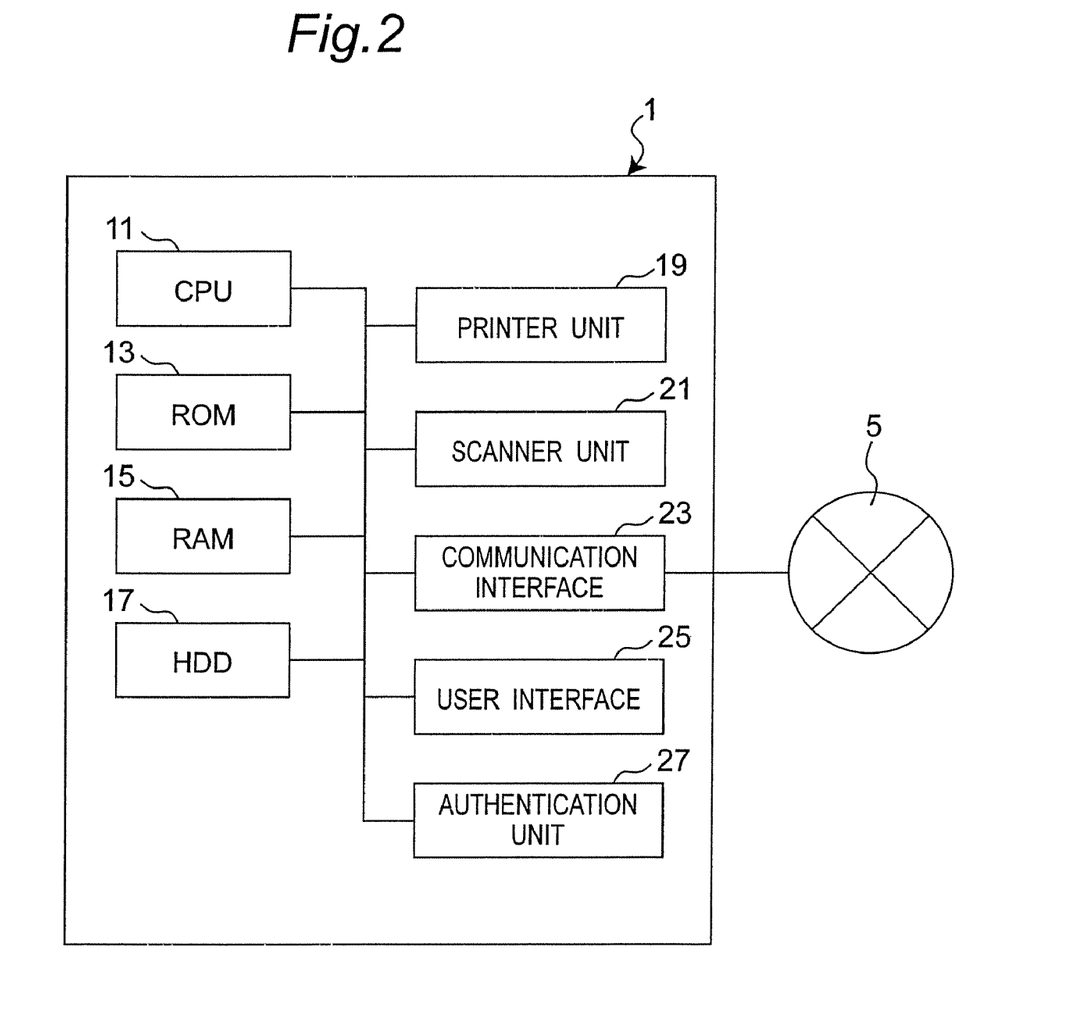
FIG. 2 is a hardware configuration diagram of an image forming device according to the embodiment of the present invention.

FIG. 2 is a block diagram of a hardware configuration of the MFP 1.

The MFP 1 includes a central processing unit (CPU) 11, a read-only memory (ROM) 13, a random access memory (RAM) 15, a hard disc drive (HDD) 17, a printer unit 19, a scanner unit 21, a communication interface 23, a user interface 25, and the authentication unit 27, which are connected to each other using a data bus.

The CPU 11 executes an image forming program held in the ROM 13, the RAM 15, or the HDD 17, or executes an image forming program provided via the communication interface 23, and processes the data held in the ROM 13, the RAM 15, or the HDD 17. The CPU 11 configures a control unit etc. of the MFP 1 (image forming device) by executing such programs, and realizes the function of the image forming device of the present embodiment. The image forming program may be installed in advance in the image forming device. Alternatively, the image forming program may be provided to the image forming device by way of a storage medium such as a flexible disc (FD) and an optical disc, or through a communication function such as the Internet.

The ROM 13, the RAM 15, and the HDD 17 are storage devices holding data and programs. The MFP 1 appropriately and suitably uses such storage device groups, and holds the data and the programs that need to be held.

The printer unit 15 executes printout based on the data of the document, and outputs a document printed material printed on a paper medium etc.

The scanner unit 21 photoelectrically reads the information recorded on the paper medium etc., and then generates image data of the relevant information.

The communication interface 23 is an interface for performing transmission and reception of data between the MFP 1 and an external device.

The user interface 25 is an operation unit for performing provision and reception of information with the user. The user interface 25 includes a display unit for presenting the information to the user and an input unit for receiving information from the user. The user interface 25 may be obtained by integrally configuring the display unit and the input unit using a liquid crystal touch panel. The user interface 25 may be used as a predetermined authentication means for the authentication print printout process. The user can input information necessary for the user authentication using the user interface 25.

The authentication unit 27 is an information input device used in the user authentication for starting the execution of the printout in the authentication print printout process. The authentication unit 27 may be a biometric authentication unit and the like. The authentication unit 27 may also be an IC card reader for reading information recorded on an IC card (smart card) possessed by the user. The authentication unit 27 is unnecessary when executing user authentication using a password input by the user. In this case, user authentication is executed when the user inputs a password etc. using the user interface 25.

<Functional Configuration of the Image Forming Device>

Figure 3:
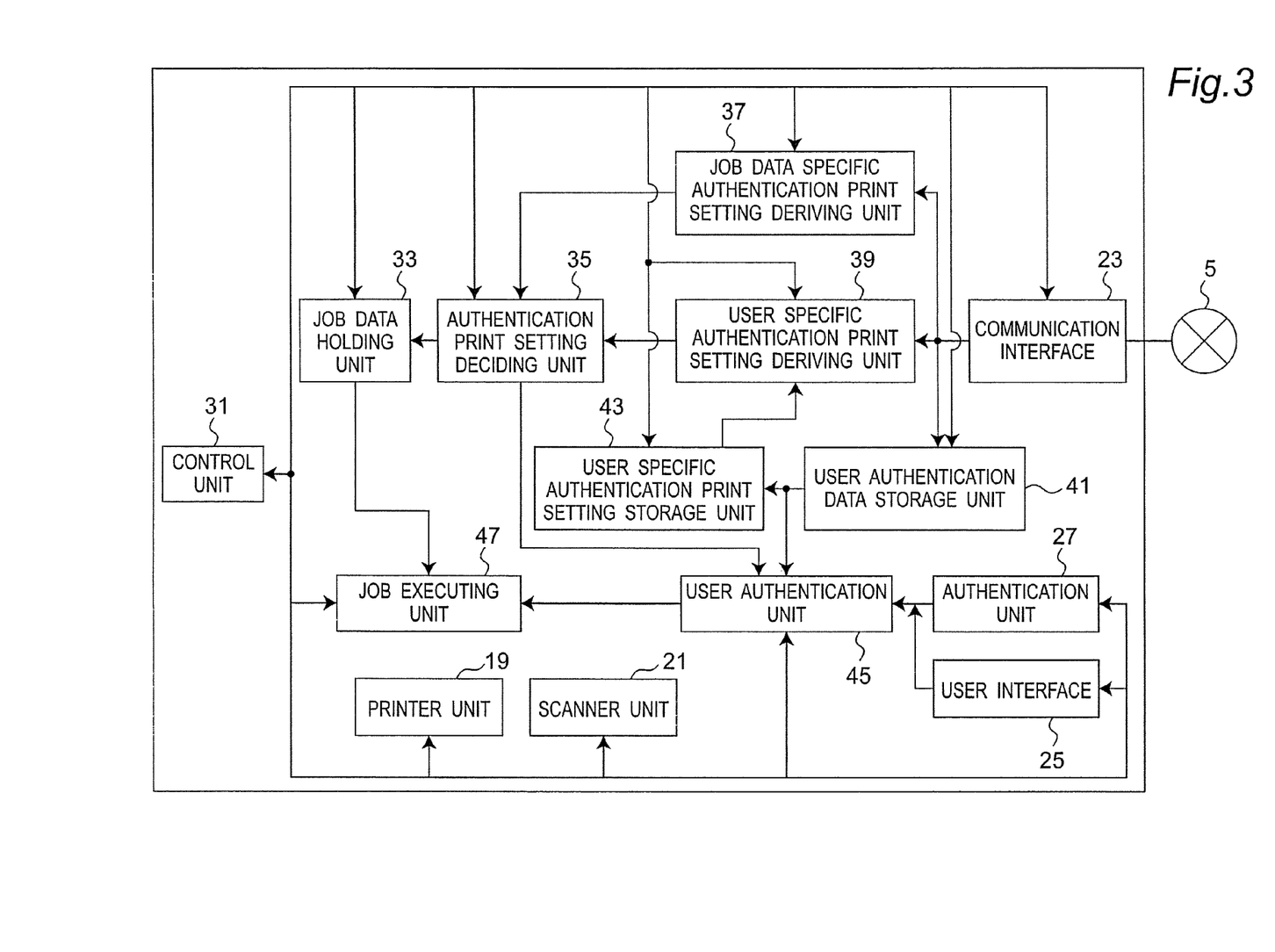
FIG. 3 is a block diagram of a functional configuration of the image forming device.

FIG. 3 is a block diagram of the configuration of the MFP 1 using functional blocks. Functions of the MFP 1 not related to the present embodiment are not illustrated.

The MFP 1 includes a control unit 31. The control unit 31 is realized when the CPU 11 (FIG. 2) executes the image forming program of the present embodiment, as described above. The control unit 31 is connected to each block of the MFP 1 to enable transmission and reception of the data therewith, and recognizes the state of each block to appropriately control the operation of each block.

The communication interface 23 receives a job data via the network 5. The job data contains print attribute data including data on various settings and document data (document/image data) in the case of print job data. The job data is sent to a job data specific authentication print setting deriving unit 37 and a user specific authentication print setting deriving unit 39.

The job data specific authentication print setting deriving unit 37 receives the job data, references the job data, and derives whether or not the authentication print setting needs to be turned "ON" when executing the job related to the job data.

In the derivation of the job data specific authentication print setting driving unit 37, the data indicating the property of the job related to the job data is referenced, and the necessity of turning "ON" the authentication print setting is derived. The data indicating the property of the job is contained in the print attribute data or the document data, and is, for example, the data indicating number of copies. If the data about the number of copies is N (where N is an arbitrary natural number of greater than or equal to two. For example, N is two), the job data specific authentication print setting deriving unit 37 concludes that the authentication print setting does not need to be turned ON in the relevant job. This is because, when printing out a plurality of copies of greater than or equal to N, the printed material to be output is assumed to be distributing material. N is herein referred to as a distributing material print determination value. In this case, it is assumed that the user desires to complete the printout as fast as possible rather than turning ON the authentication print setting and reliably ensuring information security of the printed material. The job data specific authentication print setting deriving unit 37 then outputs a notice to execute the job related to the relevant job data as normal printout process (printout process in which the authentication print setting is turned OFF) to an authentication print setting deciding unit 35. It should be noted that even if a setting to turn ON the authentication print setting is described in the received job data, the job data specific authentication print setting deriving unit 37 outputs a notice to execute the job as normal printout process to the authentication print setting deciding unit 35 as a result of job property data derivation.

The natural number N may be an arbitrary natural number N. The arbitrary natural number N may be input and set in the MFP 1 in advance. The MFP 1 may research the frequently used number of copies, and determine the number based on the result of the research.

If the data about the number of copies is a natural number of less than N, the job data specific authentication print setting deriving unit 37 concludes that the authentication print setting needs to be turned ON since the job related to the job data is a printout process of a confidential document. In this case, the job data specific authentication print setting deriving unit 37 outputs a notice to execute the job related to the job data as the authentication print (printout process in which the authentication print setting is turned ON) to the authentication print setting deciding unit 35.

Alternatively, the data indicating the property of the job may be data of an electronic signature contained in the job data. In this case, the job data specific authentication print setting deriving unit 37 may reference the data of the electronic signature, determine that the job related to the job data is a printout process related to a distributing material when found that the data of the electronic signature is a legitimate data, and conclude that the authentication print setting does not need to be turned ON.

Alternatively, the data indicating the property of the job may be data indicating a source of the job data contained in the job data. In this case, the job data specific authentication print setting deriving unit 37 may reference the data indicating the source of the job data, and conclude that the authentication print setting does not need to be turned ON for the job related to the relevant job data when found that the source is within the intranet to which the MFP 1 is included. On the contrary, if the data indicating the source of the job data is found to be outside the intranet, the job data specific authentication print setting deriving unit 37 concludes that the authentication print setting needs to be turned ON for the job related to the relevant job data.

In the modifications to be hereinafter described, the job data specific authentication print setting deriving unit 37 extracts data indicating the property of the job (e.g., distributing material or confidential document) from the data contained in the document data (document/image data). The data contained in the document data (document/image) includes document information such as file name (MS-DOS file name), updated date and time, created date and time, and the like of the data file of the document contained in the document data, and information (e.g., character string "document version X.YZ" (X, Y, Z may be alphanumeric characters)) recorded as data in the data file of the document.

The user specific authentication print setting deriving unit 39 receives the job data, references the job data, and derives whether or not the authentication print setting needs to be turned "ON" when executing the job related to the relevant job data.

In the derivation of the user specific authentication print setting deriving unit 39, data indicating the user who instructed the job related to the job data is referenced, and the necessity of turning "ON" the authentication print setting is derived. The data indicating the user who gave the instruction is normally contained in the print attribute data.

In the MFP 1, a user specific authentication print setting storage unit 43, to be hereinafter described, stores ON/OFF of the authentication print setting for each user. The user specific authentication print setting deriving unit 39 references the data indicating the user who instructed the job contained in the job attribute data of the job data, and inquires the user specific authentication print setting storage unit 43 on the authentication print setting of the user who gave the instruction. The user specific authentication print setting deriving unit 39 acquires information on the ON/OFF setting of the authentication print on the user as a result. The user specific authentication print setting deriving unit 39 outputs to the authentication print setting deciding unit 35 a notice on whether the job related to the job data should be executed as the printout in which the authentication print setting is turned ON or as a normal printout process (printout process in which the authentication print setting is turned OFF) based on the acquired information. It should be noted again that, even if the ON setting about the authentication print setting is described in the received job data, the user specific authentication print setting deriving unit 39 outputs to the authentication print setting deciding unit 35 a notice to execute as a normal printout process as user specific derivation's result in the case where "authentication print setting: OFF" is stored in the authentication print setting storage unit 43 with respect to the user's job. The function of the user specific authentication print setting storage unit 43 may partially or entirely be outsourced to an external server (e.g., authentication server SV1).

The authentication print setting deciding unit 35 receives the result of the job property data derivation, the result of the user specific derivation, and the job data. The job data specific authentication print setting deriving unit 39 sets the printout setting related to the relevant job data to ON if at least one of the received result of the job property data derivation or the result of the user specific derivation indicates that the authentication print setting needs to be turned ON. The "ON/OFF" of the authentication print setting is recorded and held as "True"/"False" (corresponding to "ON"/"OFF") in an authentication print setting flag, which is one parameter that can be recorded in the job attribute data of the job data.

The job data holding unit 33 temporarily holds the job data related to the printout job which authentication print setting (authentication print printout process setting) is set to "ON" until the user authentication is successfully completed. The job data holding unit 33 receives the job data from the authentication print setting deciding unit 35, temporarily holds the job data, and sends the job data to a job executing unit 47. The job data holding unit 33 holds the job data which authentication print setting flag is "True".

The user authentication unit 45 performs user authentication using the authentication unit 27, the user interface 25, and the like when the authentication print setting of the job data is set to "ON", and outputs the result of the user authentication. The authentication may be performed by providing information necessary for the user authentication in the MFP (PA1) in advance, and the user authentication may be completed only in the MFP (PA1). Alternatively, the information input from the authentication unit 27 etc. may be transmitted to the authentication server SV1 (FIG. 1) to ask the authentication server SV1 to perform the authentication, and the result of the authentication may be received from the authentication server SV1.

The job data executing unit 47 executes the job based on the received job data. Regarding the job which authentication print setting is set to "ON", the job (e.g., printout) of the user related to the relevant user authentication starts when the result of the user authentication output by the user authentication unit 45 is success.

<Image Forming Process Flow>

The flow of processes of the image forming device when the user instructs printout in the image forming device of the image forming system will now be described with reference to FIG. 4.

Figure 4:
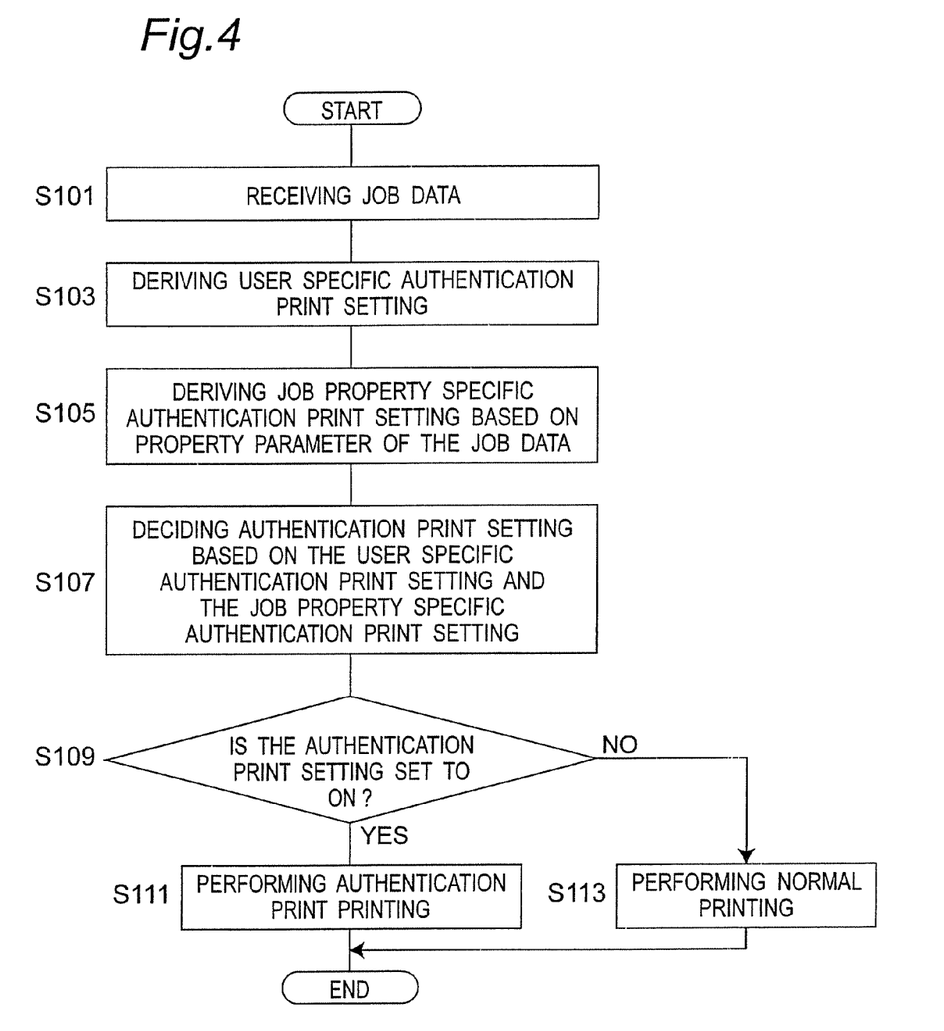
FIG. 4 is a flowchart of processes in the image forming device.

FIG. 4 is a flowchart of processes in the image forming device.

In relation to step S101, the user instructs execution of a job including printing of a document using the PC 3 and the like. The user selects a printer (image forming device (e.g., MFP 1)) for printing out the document, and inputs the selected printer to the PC 3. The PC 3 transmits job data to the selected printer (image forming device (e.g., MFP 1)).

The job data is transmitted to the MFP 1.

In step S101, the authentication print setting deciding unit 35 of the MFP 1 receives the job data via the communication interface 23.

In step S103, the user specific authentication print setting deriving unit 39 of the MFP 1 references the user name data of the job attribute data of the received job data, and acquires the user name of the user who instructed the job related to the relevant job data.

Figure 5:
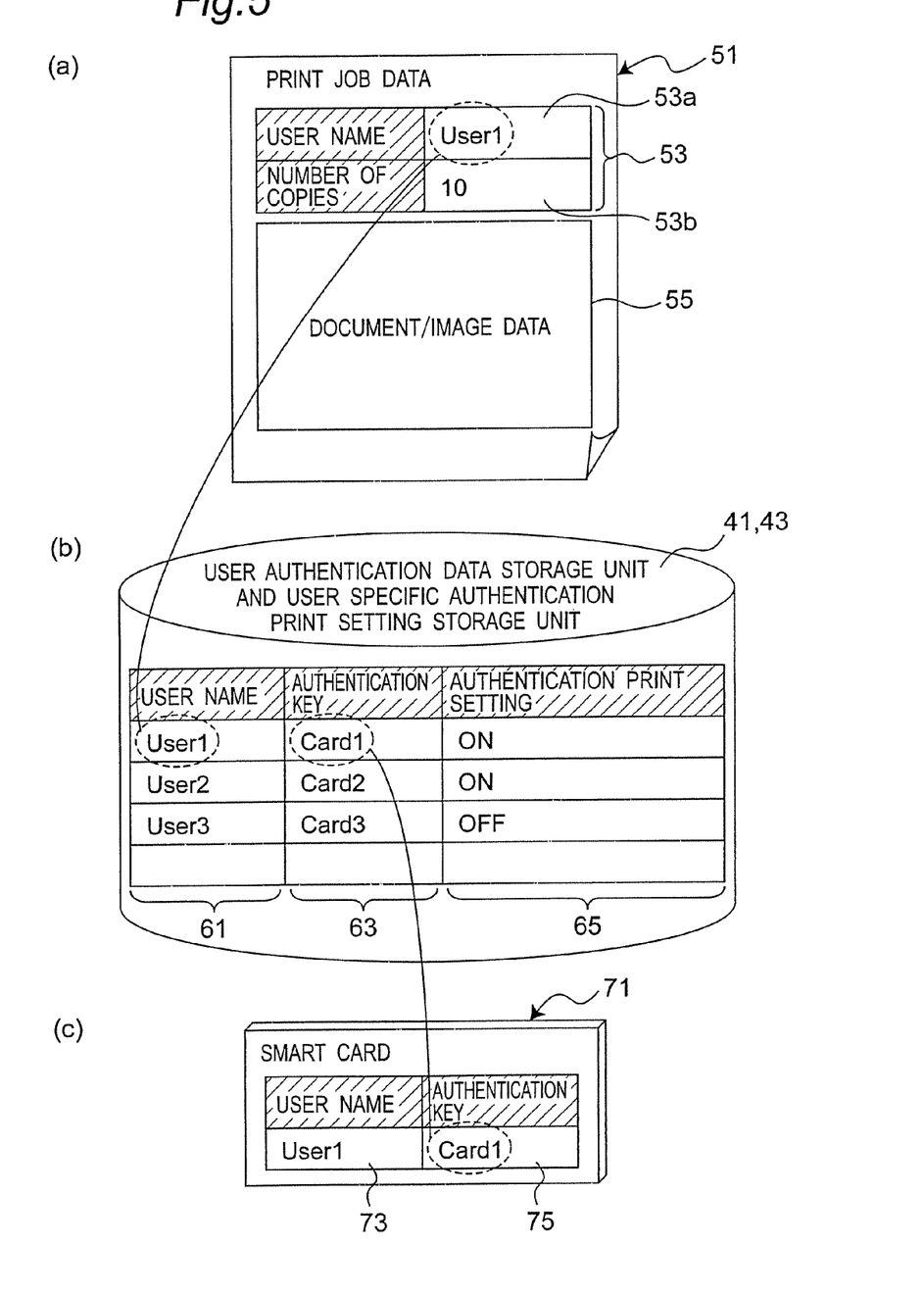
FIG. 5 is a schematic configuration diagram of print job data (A), a schematic configuration diagram of data held in a user authentication data storage unit and a user specific authentication print setting storage unit (B), and a schematic configuration diagram of data held in a smart card (C)

FIG. 5 is a schematic diagram of a data configuration of the print job data (A), the user authentication data storage unit 41 and the user specific authentication print setting storage unit 43 (B), and the smart card 71 (C). With reference to (A) in FIG. 5, the print job data 51 includes user name data 53a and data about number of copies 53b as print attribute data 53. In addition, the job data 51 includes document data (document/image data) 55. (B) in FIG. 5 is a diagram of the data in the user authentication data storage unit 41 and the user specific authentication print setting storage unit 43, in which data commonly held in the both unit 41 and 43 are shown all together in a data series (series 61). The user authentication data storage unit 41 holds user name data series 61 and authentication key data series 63. The user specific authentication print setting storage unit 43 holds the user name data series 61 and authentication print setting data series 65.

The user specific authentication print setting deriving unit 39 recognizes that the user who instructed the job as "User1" from the user name data 53a of the job data 41, searches for the user name data series 61 of the user specific authentication print setting storage unit 43 with "User1" as the key, and acquires the authentication print setting with respect to the relevant user from the authentication print setting data series 65 of the relevant user.

The user specific authentication print setting deriving unit 39 outputs a user specific derivation's result indicating authentication print setting: ON to the authentication print setting deciding unit 35 if the acquired authentication print setting is "ON". The user specific authentication print setting deriving unit 39 outputs a user specific derivation's result indicating authentication print setting: OFF to the authentication print setting deciding unit 35 if the acquired authentication print setting is "OFF".

Returning to FIG. 4, in step S105, the job property specific authentication print setting deriving unit 37 of the MFP 1 extracts the data indicating the property of the job from the received job data. For instance, the job property specific authentication print setting deriving unit 37 extracts the data about number of copies 53b. In the example shown in FIG. 5A, the data about the number of copies 53b is 10. The job property specific authentication print setting deriving unit 37 determines whether the value 10 is greater than or equal to or smaller than the distributing material print determination value N. If the value indicated by the data about the number of copies 53b is greater than or equal to the distributing material print determination value, the job property specific authentication print setting deriving unit 37 outputs the job property data derivation's result indicating authentication print setting: OFF to the authentication print setting deciding unit 35. If the value indicated by the data about the number of copies 53b is smaller than the distributing material print determination value, the job property specific authentication print setting deriving unit 37 outputs the job property data derivation's result indicating authentication print setting: ON to the authentication print setting deciding unit 35.

In step S107, the authentication print setting deciding unit 35 of the MFP 1 decides whether or not to have the job related to the job data as the authentication print printout process based on the user specific derivation's result and the job property data derivation's result.

If one of either the user specific derivation's result or the job property data derivation's result indicates authentication print setting: ON, and the other indicates authentication print setting: OFF, the authentication print setting deciding unit 35 may decide the authentication print setting so that the printout process of the job related to the job data is the authentication print printout that prioritizes ensuring of information security.

In step S109, the MFP 1 determines whether or not the authentication print setting of the job data is set to ON or set to OFF. The process proceeds to step S111 if the authentication print setting is set to ON ("YES" in step S109). The process proceeds to step S113 if the authentication print setting is set to OFF ("NO" in step S109).

In step S111, the job executing unit 47 of the MFP 1 processes the job related to the job data as authentication print printout process. In this step, the user authentication unit 45 performs user authentication using the authentication unit 27. User authentication is, for example, user authentication using a smart card (IC card) possessed by the user. The user brings the smart card 71 (FIG. 5C) closer to the authentication unit 27. The authentication unit 27 acquires the user name data 73 ("User1") and the authentication key data 73 ("Card1") recorded on the smart card 71 from the smart card 71, and sends the relevant data to the user authentication unit 45. The user authentication unit 45 searches for the user name data series 61 of the user authentication data storage unit 41 ((B) in FIG. 5) with the user name data 73 acquired from the authentication unit 27 as the key, and acquires the authentication key data 63 of the relevant user. The user authentication unit 45 compares the authentication key data 75 acquired from the smart card 71 and the user authentication key 63 stored in the user authentication data storage unit 41, and determines "success"/"fail" of the user authentication. When the user authentication is successfully completed, the job executing unit 47 acquires the job data from the job data holding unit 33, and executes the printout process based on the job data.

In step S113, user authentication is not performed. The job executing unit 47 executes the normal printout process.

Therefore, in the present embodiment, the MFP 1 generates the job data after automatically and forcibly switching the authentication print setting to "ON" or "OFF" based on the data contained in the job data even if the data related to the authentication print setting is not explicitly recorded and indicated in the job data, which has been transmitted from the terminal. The printout process is executed with the authentication print automatically and forcibly set as a printout method in the printout process where the risk is assumed high in terms of ensuring information security in the normal printout process from the standpoint of information security, and thus information security is ensured.

When printing distributing materials, the printout is automatically and forcibly switched to the normal printout process. Therefore, in a case where the risk on information security remains low even when the normal printout process is performed, enhancement in productivity of the MFP and simple operability are realized. Furthermore, the MFP 1 can store the authentication print setting in advance for each user for users having a high (or low) frequency of performing the printout process of information with high confidentiality.

<Modification 1>

In the present modification, a series of processes from the reference of data indicating the property of the job to the output of the job property data derivation's result of the job data specific authentication print setting deriving unit 37 partially differs from the above embodiment. Other than this aspect, the present modification is the same as the above embodiment.

Figure 6A:
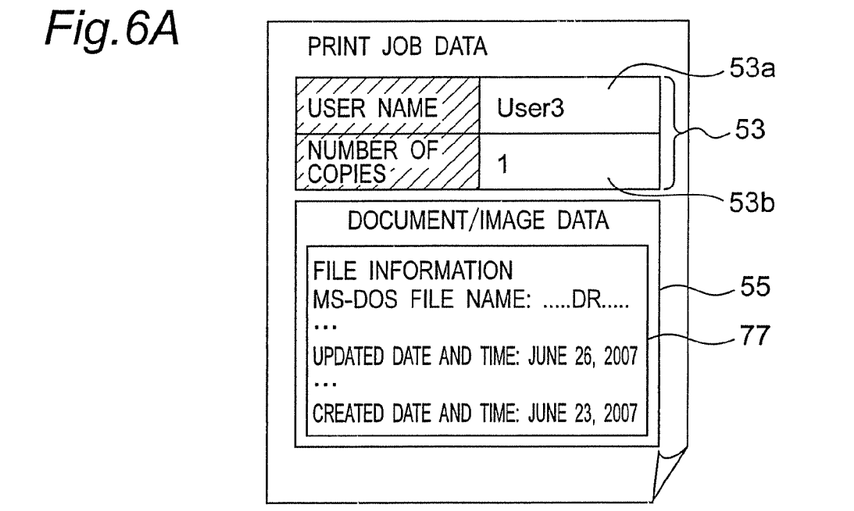
FIG. 6A is a schematic configuration diagram of print job data.

In this modification as well, the job data contains the print attribute data and the document data (document/image data), similar to the above embodiment. FIG. 6A is a schematic diagram of the data configuration of the job data (print job data).

In the present modification, the job data specific authentication print setting deriving unit 37 references the document data (document/image data) 55 as the data indicating the property of the job. The document data 55 contains document (file) information 77 such as file name (MS-DOS file name), updated date and time, and created date and time of the data file of the document contained in the document data.

The job data specific authentication print setting deriving unit 37 references the file name and the updated date and time from the document information 77. If a predetermined character string is contained in the referenced file name, the job data specific authentication print setting deriving unit 37 outputs the result of the job property data derivation indicating authentication print setting: ON. For instance, if "DR" (abbreviation for Design Review) is contained as the predetermined character string, the document is assumed as the source material for design review. The MFP 1 handles the document as a confidential document until a certain period ends such as one week from the updated date and time, which corresponds to the period of the design review, and outputs the result of the job property data derivation indicating authentication print setting: ON.

The job data specific authentication print setting deriving unit 37 thus presumes the property of the document related to the job data with whether or not the predetermined character string is contained in the file name of the document information 77 as a determination criteria, and determines and outputs the result of job property data derivation based on the presumed property of the document. Furthermore, the job data specific authentication print setting deriving unit 37 calculates the elapsed time from the final updated date and time of the document to the current time, determines that the confidentiality of the document is lowered at the present time in a case where the predetermined time is elapsed even if the presumed document property is requesting authentication print printout process, and determines and outputs the result of the job property data derivation indicating authentication print setting: OFF. The predetermined character string is a character string such as "DR" and "settlement of accounts". The predetermined period may be appropriately set according to the type of the predetermined character string. The calculation of the elapsed time may also be performed based on the data indicating the updated date and time and the data indicating the time the job is registered. Alternatively, the MFP 1 may have a clock function, and the calculation may be made using the clock function.

The job data specific authentication print setting deriving unit 37 may also search a data file of a document, extracts information recorded as data of the document (e.g., character string "document version X.YZ" (X, Y, Z are alphanumeric characters)), and determines and outputs the result of job property data derivation based on whether or not the document version "X.YZ" is younger than the predetermined value.

The job data specific authentication print setting deriving unit 37 may also acquire acknowledgment state of the document of the data file name of the document from an external work flow system, determines the document as a confidential document in a case where the document is not acknowledged, and determines and outputs the result of job property data derivation indicating authentication print setting: ON.

Figure 6B:
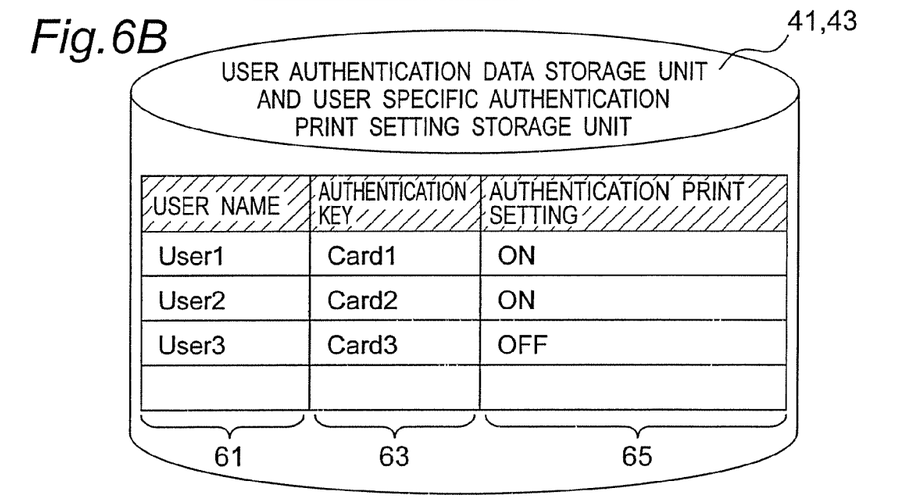
FIG. 6B is a schematic configuration diagram of data held in a user authentication data storage unit and a user specific authentication print setting storage unit.
Figure 6C:
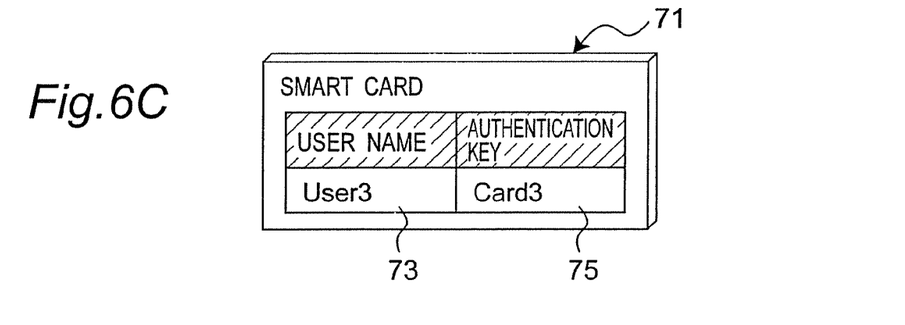
FIG. 6C is a schematic configuration diagram of data held in a smart card.
Figure 7A:
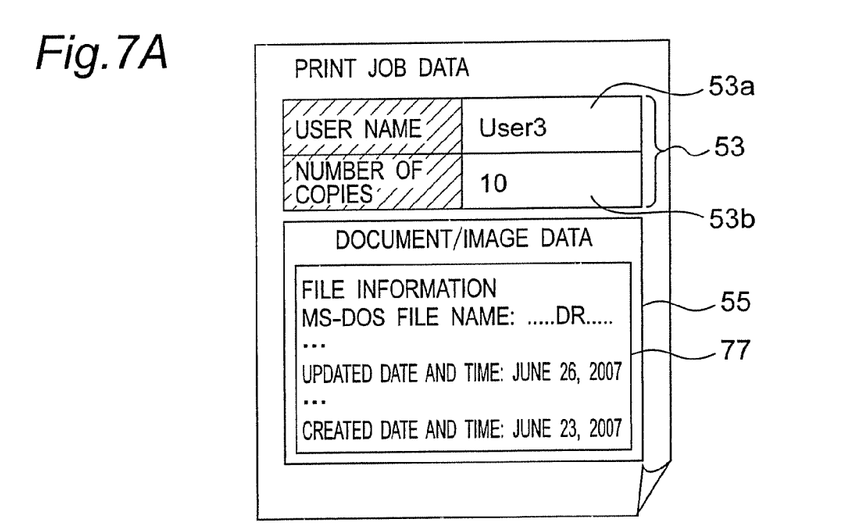
FIG. 7A is a schematic configuration diagram of print job data.
Figure 7B:
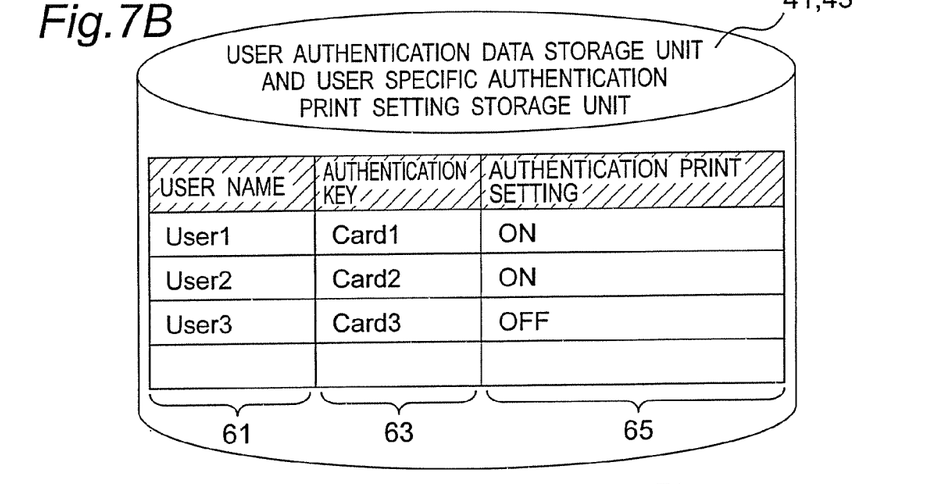
FIG. 7B is a schematic configuration diagram of data held in a user authentication data storage unit and a user specific authentication print setting storage unit.
Figure 7C:
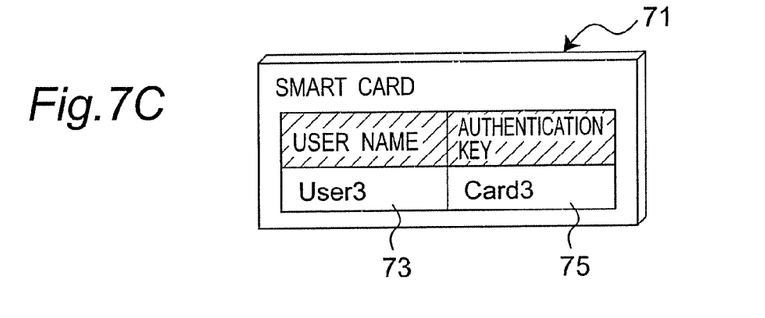
FIG. 7C is a schematic configuration diagram of data held in a smart card.

The data configuration shown in FIGS. 6B and 6C have a similar configuration as the data configuration described with reference to (B) and (C) in FIG. 5, and thus the description thereof will be omitted.

<Modification 2>

In the present modification, a case where the job data specific authentication print setting deriving unit 37 references a plurality of pieces of data indicating several types of the property of the job, which are contained in at least one of the job attribute data 53 and the document data 55 (FIG. 6A), and outputs the result of job property data derivation will be described.

For instance, when the data about number of copies 53b of the job attribute data 53 indicates a value greater than or equal to the distributing material print determination value and the job related to the job data is presumed to be the printout process of a distributing material and the character string "DR" is contained in the file name of the document information of the document data 55 and a predetermined time has not elapsed from the updated date and time, the job data specific authentication print setting deriving unit 37 outputs the result of job property data derivation indicating authentication print setting: ON in view of social demands related to ensuring information security. If the difference between the current time and the updated date and time exceeds a predetermined period (e.g., one week), the result of job property data derivation indicating authentication print setting: OFF may be output. That is, even with respect to the job related to the document in which the predetermined character string "DR" is contained in the file name, the resultant of the printout is presumed to be a distributing material when the predetermined period has elapsed, and result of job property data derivation indicating authentication print setting: OFF may be output.

Therefore, in the present embodiment, the image forming device automatically and forcibly determines ON/OFF of the authentication print setting and executes the printout process based on various data contained in the job data. The various data does not need to be data explicitly indicating ON/OFF of the authentication print setting. The user does not need to perform settings such as the setting of whether or not to perform user authentication and the setting of the password related to user authentication when instructing the execution of the job to the image forming device. Thus, the user can rapidly perform the printout without being bothered with the setting procedure at the time of inputting the job and the unnecessary user authentication procedure, whereby the operability of the user on the image forming device significantly enhances. Therefore, in the present embodiment, the image forming device resolves the bother of the user in the setting process related to authentication print setting. Furthermore, the information security is sufficiently ensured since the image forming device automatically and forcibly sets the authentication print setting to ON/OFF appropriately. The present embodiment succeeds in solving the problems of enhancing the productivity of the image forming device and improving the operability, and ensuring information security at high level.

When determined that the image forming device etc. according to the present embodiment requires user authentication from the standpoint of ensuring information security based on a predetermined parameter, the image forming device automatically changes the setting to request the user for user authentication at the start of execution of the printout. Thus, the information security on the printout is sufficiently ensured in the present embodiment.

The image forming device according to the present invention is an image forming device capable of satisfying both excellent productivity and operability, and reliable ensuring of information security at high level.

What is claimed is:

1. An image forming device capable of performing an authentication print printing, which is a printout process for performing user authentication using a predetermined authentication device and determining a start of execution of a printout process based on a result of the user authentication, the image forming device comprising:
   a communication interface that receives job data from a terminal;
   a job data property deriving unit that derives a property of a job related to the job data by referencing data contained in the job data other than data explicitly indicating to execute/not to execute the authentication print printing, and outputs the property as job property data;
   an authentication print setting deciding unit that decides whether or not to execute the job related to the job data as the authentication print printing based on the job property data;
   an authentication unit that is the predetermined authentication device;
   a user authentication unit that outputs the result of the user authentication using said authentication unit, and wherein the result of the user authentication is an authentication print printout process or a normal printout process; and
   a job executing unit that executes the job related to the job data based on the result of the user authentication, and wherein the start of the execution of the printout process for the normal printout process is immediately upon accepting the job.

2. The image forming device according to claim 1, further comprising:

a user specific authentication print setting storage unit that stores ON/OFF setting of the authentication print setting on a user-by-user basis; and a user specific authentication print setting deriving unit that derives ON/OFF setting of the authentication print setting related to the user from said user specific authentication print setting storage unit by referencing data which is contained in the job data and indicates a user who instructed the job related to the job data, wherein said authentication print setting deciding unit decides whether or not to execute the job related to the job data as the authentication print printing based on the authentication print setting related to the user, which is derived by said user specific authentication print setting deriving unit.

3. The image forming device according to claim 2, wherein, when a result of the decision based on the job property data is different from a result of the decision based on the authentication print setting related to the user, which is derived by said user specific authentication print setting deriving unit, said authentication print setting deciding unit decides whether or not to execute the job related to the job data as the authentication print printing based on the result of the decision based on the job property data.

4. An image forming device capable of performing an authentication print printing, which is a printout process for performing user authentication using a predetermined authentication device and determining a start of execution of a printout process based on a result of the user authentication, the image forming device comprising:

a communication interface that receives job data from a terminal;

a job data property deriving unit that derives a property of a job related to the job data by referencing data contained in the job data other than data explicitly indicating to execute/not to execute the authentication print printing, and outputs the property as job property data;

an authentication print setting deciding unit that decides whether or not to execute the job related to the job data as the authentication print printing based on the job property data;

an authentication unit that is the predetermined authentication device;

a user authentication unit that outputs the result of the user authentication using said authentication unit;

a job executing unit that executes the job related to the job data based on the result of the user authentication;

wherein said job data property deriving unit outputs the job property data indicating whether or not the job related to the job data includes printing of a distributed material; and said authentication print setting deciding unit decides the authentication print setting to OFF setting when the job property data indicates that the job includes the printing of the distributed material.

5. An image forming device capable of performing an authentication print printing, which is a printout process for performing user authentication using a predetermined authentication device and determining a start of execution of a printout process based on a result of the user authentication, the image forming device comprising:

a communication interface that receives job data from a terminal;

a job data property deriving unit that derives a property of a job related to the job data by referencing data contained in the job data other than data explicitly indicating to execute/not to execute the authentication print printing, and outputs the property as job property data;

an authentication print setting deciding unit that decides whether or not to execute the job related to the job data as the authentication print printing based on the job property data;

an authentication unit that is the predetermined authentication device;

a user authentication unit that outputs the result of the user authentication using said authentication unit;

a job executing unit that executes the job related to the job data based on the result of the user authentication; and wherein said job data property deriving unit outputs the job property data indicating whether or not the job related to the job data includes printing of a confidential document; and said authentication print setting deciding unit decides the authentication print setting to ON setting when the job property data indicates that the job includes the printing of the confidential document.

6. An image forming device capable of performing an authentication print printing, which is a printout process for performing user authentication using a predetermined authentication device and determining a start of execution of a printout process based on a result of the user authentication, the image forming device comprising:

a communication interface that receives job data from a terminal;

a job data property deriving unit that derives a property of a job related to the job data by referencing data contained in the job data other than data explicitly indicating to execute/not to execute the authentication print printing, and outputs the property as job property data;

an authentication print setting deciding unit that decides whether or not to execute the job related to the job data as the authentication print printing based on the job property data;

an authentication unit that is the predetermined authentication device;

a user authentication unit that outputs the result of the user authentication using said authentication unit;

a job executing unit that executes the job related to the job data based on the result of the user authentication; and wherein said job data property deriving unit outputs the job property data indicating:

whether or not the job related to the job data includes printing of a distributed material; and whether or not the job related to the job data includes printing of a confidential document; and said authentication print setting deciding unit decides the authentication print setting to ON setting when the job property data indicates that the job includes the printing of the distributed material and the printing of the confidential document.

7. A non-transitory computer readable medium storing an image forming program executable by a computer of an image forming device capable of executing an authentication print printing, which is a printout process for performing user authentication using a predetermined authentication device and determining a start of execution of a printout process based on a result of the user authentication, the image forming program comprising:

code that receives job data from a terminal;

code that derives a property of a job related to the job data by referencing data contained in the job data other than data explicitly indicating to execute/not to execute the authentication print printing, and outputs the property as job property data;

code that decides whether or not to execute the job related to the job data as the authentication print printing based on the job property data;

code that outputs the result of the user authentication using an authentication unit which is the predetermined authentication device, and wherein the result of the user authentication is an authentication print printout process or a normal printout process; and code that executes the job related to the job data based on the result of the user authentication, and wherein the start of the execution of the printout process for the normal printout process is immediately upon accepting the job.

8. The image forming device according to claim 1, wherein said authentication print setting for the normal printout process is turned OFF.

9. The image forming device according to claim 4, wherein said distributed material comprises a plurality of printouts of said job.

10. The image forming device according to claim 9, wherein said plurality of printouts of the job data is greater than or equal to two.

11. The image forming device according to claim 4, wherein said authentication print setting for said distributed material is turned OFF for printing a plurality of copies of greater than or equal to N, wherein N is a distributed material print determination value, which is set by a user.

12. The image forming device according to claim 11, wherein said distributed material print determination value is determined based on a determination of a number of printed copies, which are frequently printed for said distributed material.

13. The computer readable medium according to claim 7, further comprising code that:
stores ON/OFF setting of the authentication print setting on a user-by-user basis; and
derives said ON/OFF setting of the authentication print setting related to the user from a user specific authentication print setting storage unit by referencing data which is contained in the job data and indicates a user who instructed the job related to the job data,
wherein said authentication print setting deciding unit decides whether or not to execute the job related to the job data as the authentication print printing based on the authentication print setting related to the user, which is derived by said user specific authentication print setting deriving unit.

14. The computer readable medium according to claim 13, further comprising code that when a result of the decision based on the job property data is different from a result of the decision based on the authentication print setting related to the user, which is derived by said user specific authentication print setting deriving unit, said authentication print setting deciding unit decides whether or not to execute the job related to the job data as the authentication print printing based on the result of the decision based on the job property data.

15. The computer readable medium according to claim 7, further comprising code that:
outputs the job property data indicating whether or not the job related to the job data includes printing of a distributed material, and
decides the authentication print setting to OFF setting when the job property data indicates that the job includes the printing of the distributed material.

16. The computer readable medium according to claim 7, further comprising code that:
outputs the job property data indicating whether or not the job related to the job data includes printing of a confidential document; and
decides the authentication print setting to ON setting when the job property data indicates that the job includes the printing of the confidential document.

17. The computer readable medium according to claim 7, further comprising code that:
includes printing of a distributed material; and whether or not the job related to the job data includes printing of a confidential document; and
decides the authentication print setting to ON setting when the job property data indicates that the job includes the printing of the distributed material and the printing of the confidential document.

18. The computer readable medium according to claim 15, wherein said distributed material comprises a plurality of printouts of said job.

19. The computer readable medium according to claim 18, wherein said plurality of printouts of the job data is greater than or equal to two.

* * * * *